(12) United States Patent
Ohzu et al.

(10) Patent No.: US 11,142,064 B2
(45) Date of Patent: Oct. 12, 2021

(54) ELECTRIC VEHICLE

(71) Applicant: HONDA MOTOR CO., LTD., Tokyo (JP)

(72) Inventors: Tatsuya Ohzu, Wako (JP); Yutaka Arimura, Wako (JP); Daisuke Hoshino, Wako (JP); Shingo Soma, Wako (JP); Yosuke Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 16/366,001

(22) Filed: Mar. 27, 2019

(65) Prior Publication Data
US 2019/0299776 A1 Oct. 3, 2019

(30) Foreign Application Priority Data

Mar. 28, 2018 (JP) .............................. JP2018-061435

(51) Int. Cl.
*F16H 3/091* (2006.01)
*F16H 57/021* (2012.01)
*F16H 57/02* (2012.01)
*B60K 17/04* (2006.01)
*B60K 17/22* (2006.01)

(52) U.S. Cl.
CPC ............ *B60K 17/043* (2013.01); *B60K 17/22* (2013.01); *F16H 3/091* (2013.01); *F16H 57/021* (2013.01); *B60Y 2200/91* (2013.01); *F16H 2057/02034* (2013.01); *F16H 2057/02043* (2013.01)

(58) Field of Classification Search
CPC .................. F16H 3/091; F16H 57/021; F16H 2057/02034
USPC ..................................................... 74/661, 331
See application file for complete search history.

(56) References Cited

U.S. PATENT DOCUMENTS

| | | | | |
|---|---|---|---|---|
| 10,337,603 | B2 * | 7/2019 | Nishimine | ................ F16H 1/28 |
| 10,797,568 | B2 * | 10/2020 | Ohzu | ..................... B60K 11/02 |
| 2011/0298314 | A1 * | 12/2011 | Atarashi | ................ B60K 6/405 310/54 |
| 2012/0143422 | A1 * | 6/2012 | Kitahata | .................. B60K 6/40 701/22 |
| 2013/0325237 | A1 * | 12/2013 | Ikegami | .................. B60L 1/003 701/22 |
| 2016/0355084 | A1 * | 12/2016 | Uozumi | ................. H02K 7/116 |
| 2017/0158043 | A1 | 6/2017 | Tsukamoto | |

FOREIGN PATENT DOCUMENTS

JP       2017-100590 A      6/2017

* cited by examiner

*Primary Examiner* — Ha Dinh Ho
(74) *Attorney, Agent, or Firm* — Carrier Blackman & Associates, P.C.; Joseph P. Carrier; William D. Blackman

(57) ABSTRACT

In an electric vehicle including a motor shaft connected to a drive motor, a counter shaft coupled with the motor shaft, a drive shaft coupled with the counter shaft, a drive wheel coupled with the drive shaft, a plurality of bearings configured to support the counter shaft, and a plurality of gears configured to rotate integrally with the counter shaft, a torque sensor is disposed in a region in which a slope of a bending moment occurring on the counter shaft is minimum at a time that the drive motor is driven.

10 Claims, 13 Drawing Sheets

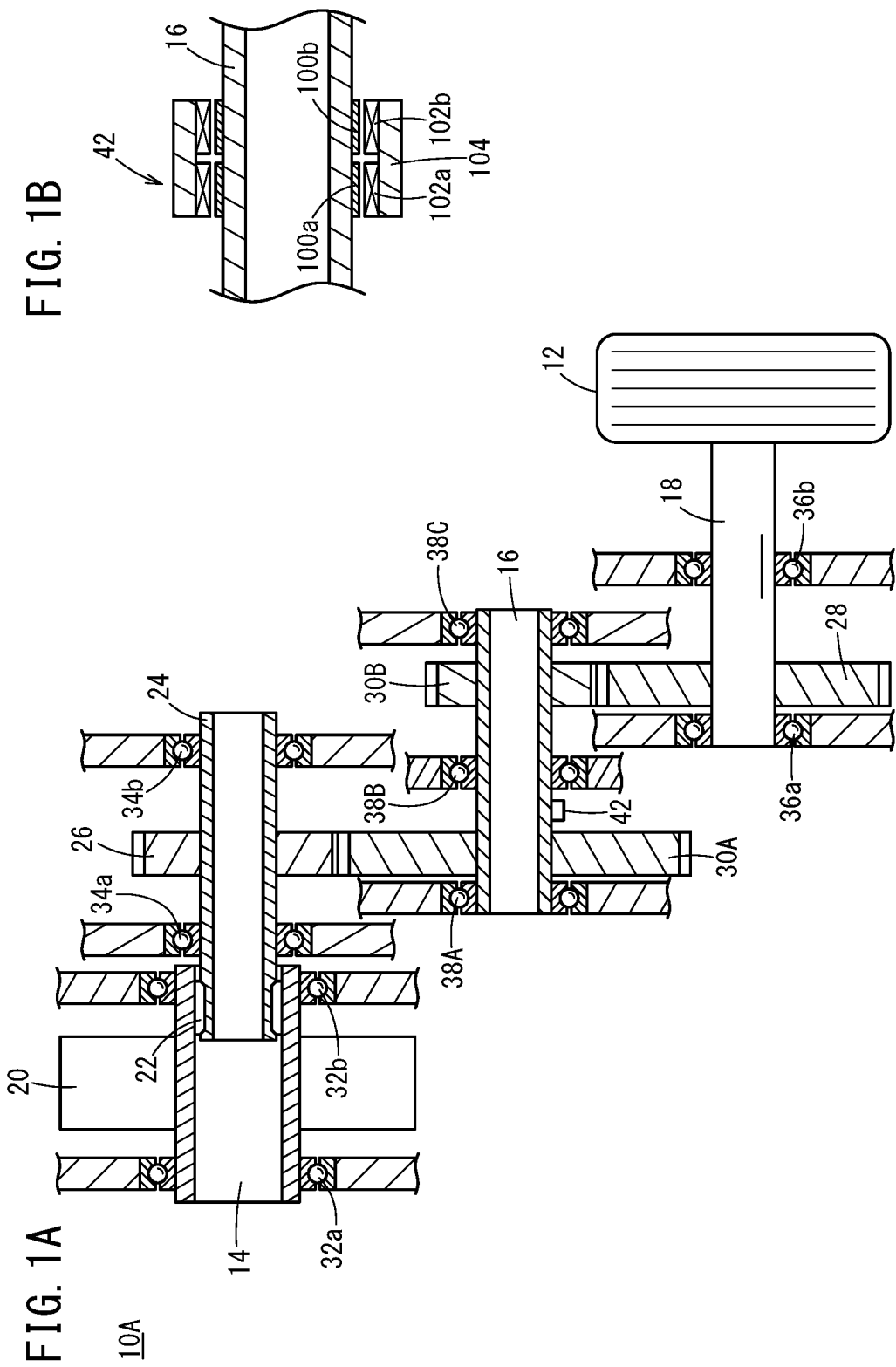

ELECTRIC VEHICLE

CROSS-REFERENCE TO RELATED APPLICATION

This application is based upon and claims the benefit of priority from Japanese Patent Application No. 2018-061435 filed on Mar. 28, 2018, the contents of which are incorporated herein by reference.

BACKGROUND OF THE INVENTION

Field of the Invention

The present invention relates to an electric vehicle equipped with a drive motor adapted to drive vehicle wheels.

Description of the Related Art

Japanese Laid-Open Patent Publication No. 2017-100590 has the object of providing a vehicle which is capable of realizing one or both of an improvement in fuel efficiency of the vehicle, and an improvement in travel performance of the vehicle (see paragraph [0008], abstract).

In order to achieve the aforementioned object, the vehicle disclosed in Japanese Laid-Open Patent Publication No. 2017-100590 comprises an internal combustion engine, a first rotary electric machine, a first switching device, a second switching device, and a control circuit. In the case that the vehicle velocity exceeds a first vehicle velocity threshold value in a state in which the first switching device is in a connected state and is transmitting motive power from the internal combustion engine to the vehicle wheels, the control circuit controls the second switching device to be placed in a disconnected state.

SUMMARY OF THE INVENTION

However, in Japanese Laid-Open Patent Publication No. 2017-100590, although a drive motor (rotary electric machine), a motor shaft, and a counter shaft, etc., are disclosed, there is no description given to the consideration of installing a torque sensor on the counter shaft, or of a suitable installation position or the like in the case of an arrangement for a torque sensor.

The present invention has been devised taking into consideration the aforementioned problems, and has the object of providing an electric vehicle in which it is possible to suppress the influence of a bending moment occurring on a counter shaft at a time that the motor is driven, and which is capable of accurately detecting a torque applied to the counter shaft.

[1] An electric vehicle according to a first aspect of the present invention is characterized by having a drive motor, a motor shaft connected to the drive motor, a counter shaft coupled with the motor shaft, a drive shaft coupled with the counter shaft, a drive wheel coupled with the drive shaft, a plurality of bearings configured to support the counter shaft, and a plurality of gears configured to rotate integrally with the counter shaft, wherein a torque sensor is disposed in a region in which a slope of a bending moment occurring on the counter shaft is minimum at a time that the drive motor is driven.

In accordance with these features, it is possible to suppress the influence of a bending moment occurring on the counter shaft at a time that the motor is driven, and it is possible to accurately detect the torque applied to the counter shaft.

[2] An electric vehicle according to a second aspect of the present invention is characterized by having a drive motor, a motor shaft connected to the drive motor, a counter shaft coupled with the motor shaft, a drive shaft coupled with the counter shaft, a drive wheel coupled with the drive shaft, a first bearing, a second bearing, and a third bearing configured to support the counter shaft, and a first gear and a second gear configured to rotate integrally with the counter shaft, wherein a positional relationship between the motor shaft, the counter shaft, and the drive shaft is defined in a manner so that, when viewed in an axial cross-section of the motor shaft, the counter shaft, and the drive shaft, respective centers of the motor shaft, the counter shaft, and the drive shaft are aligned respectively on a straight line, and assuming that a lateral load by the first gear is represented by F, a lateral load by the second gear is represented by aF where "a" indicates a gear ratio, a distance from the first bearing to the second bearing is represented by $l_1$, a distance from the second bearing to the third bearing is represented by $l_2$, a distance from the first bearing to the first gear is represented by $l_3$, a distance from the first gear to the second bearing is represented by $l_4$, a distance from the second bearing to the second gear is represented by $l_5$, and a distance from the second gear to the third bearing is represented by $l_6$, the first bearing, the second bearing, the first gear, and the second gear are arranged in a positional relationship satisfying a following expression (a) or a following expression (b):

$$a = \frac{2l_2 l_3 (l_1 + l_2)}{l_4 l_6 (l_2^2 - l_6^2)} \left[ \frac{(l_1 + l_3)(l_1^2 - l_3^2)}{2l_1 (l_1 + l_2)} + l_4 \right] \quad (a)$$

$$\frac{1}{a} = \frac{2l_1 l_6 (l_1 + l_2)}{l_3 l_5 (l_1^2 - l_3^2)} \left[ \frac{(l_2 + l_6)(l_2^2 - l_6^2)}{2l_2 (l_1 + l_2)} + l_5 \right]. \quad (b)$$

First, by arranging the respective centers of the motor shaft, the counter shaft, and the drive shaft so as to be aligned on a straight line when viewed in an axial cross-section of the motor shaft, the counter shaft, and the drive shaft, the problem of loads from the motor shaft and the drive shaft being applied with respect to the counter shaft can be simplified into a problem of bending a beam that is subjected to a lateral load. As a result, it is possible to easily determine the region in which the slope of the bending moment occurring on the counter shaft is minimum.

[3] In the second aspect of the present invention, in a case that the above-described expression (a) is satisfied, a torque sensor may be disposed within the counter shaft between the first gear and the second bearing.

In the case that the above-described expression (a) is satisfied, at a time that the drive motor is driven, the region in which the slope of the bending moment occurring on the counter shaft is minimum is the region between the first gear and the second bearing. By arranging the torque sensor in such a region, it is possible to accurately detect the torque that is applied to the counter shaft.

[4] In the second aspect of the present invention, in a case that the above-described expression (b) is satisfied, a torque sensor may be disposed within the counter shaft between the second bearing and the second gear.

In the case that the above-described expression (b) is satisfied, at a time that the drive motor is driven, the region in which the slope of the bending moment occurring on the counter shaft is minimum is the region between the second bearing and the second gear. By arranging the torque sensor in such a region, it is possible to accurately detect the torque that is applied to the counter shaft.

[5] An electric vehicle according to a third aspect of the present invention is characterized by having a drive motor, a motor shaft connected to the drive motor, a counter shaft coupled with the motor shaft, a drive shaft coupled with the counter shaft, a drive wheel coupled with the drive shaft, a first bearing and a second bearing configured to support the counter shaft, and a first gear and a second gear configured to rotate integrally with the counter shaft, wherein a positional relationship between the motor shaft, the counter shaft, and the drive shaft is defined in a manner so that, when viewed in an axial cross-section of the motor shaft, the counter shaft, and the drive shaft, respective centers of the motor shaft, the counter shaft, and the drive shaft are aligned respectively on a straight line, and assuming that a lateral load by the first gear is represented by F, a lateral load by the second gear is represented by aF where "a" indicates a gear ratio, a distance from the first bearing to the second bearing is represented by L, a distance from the first bearing to the first gear is represented by $L_1$, and a distance from the first gear to the second gear is represented by $L_2$, the first bearing, the second bearing, the first gear, and the second gear are arranged in a positional relationship satisfying a following expression (c):

$$a = \frac{L_1}{L - L_1 - L_2}. \tag{c}$$

First, by arranging the respective centers of the motor shaft, the counter shaft, and the drive shaft so as to be aligned on a straight line when viewed in an axial cross-section of the motor shaft, the counter shaft, and the drive shaft, the problem of loads from the motor shaft and the drive shaft being applied with respect to the counter shaft can be simplified into a problem of bending a beam that is subjected to a lateral load. As a result, it is possible to easily determine the region in which the slope of the bending moment occurring on the counter shaft is minimum.

[6] In the third aspect of the present invention, in a case that the above-described expression (c) is satisfied, a torque sensor may be disposed within the counter shaft between the first gear and the second gear.

In the case that the above-described expression (c) is satisfied, at a time that the motor is driven, the region in which the slope of the bending moment occurring on the counter shaft is minimum is the region between the first gear and the second gear. By arranging the torque sensor in such a region, it is possible to accurately detect the torque that is applied to the counter shaft.

[7] In the second and third aspects of the present invention, a positional relationship between the motor shaft and the drive shaft may be coaxial when viewed in the axial cross-section of each of the shafts.

In accordance with this feature, the drive motor and the drive wheel can be disposed coaxially, and the drive unit of the electric vehicle can be made compact. In this case, when the gear diameter of the drive shaft is fixed, the above-described gear ratio "a" of the counter shaft can be changed by appropriately changing the diameter of the motor shaft.

[8] In the second and third aspects of the present invention, the positional relationship between the motor shaft and the drive shaft may be defined in a manner so that, when viewed in the axial cross-section of each of the shafts, the centers of the respective shafts are aligned on the straight line, and the center of the motor shaft may be disposed on a line segment between an axial center of the counter shaft and an axial center of the drive shaft.

In accordance with this feature, the axial center of the motor shaft can be accommodated within a circle of the drive shaft, and the drive unit of the vehicle can be made compact. In this case, when the gear diameter of the drive shaft is fixed, the above-described gear ratio "a" of the counter shaft can be changed by appropriately changing the diameter of the motor shaft, or alternatively, by appropriately changing the position of the motor shaft on the above-described line segment.

According to the present invention, it is possible to suppress the influence of a bending moment occurring on the counter shaft at a time that the motor is driven, and it is possible to accurately detect the torque applied to the counter shaft.

BRIEF DESCRIPTION OF THE DRAWINGS

FIG. 1A is a cross-sectional view showing an example of a configuration existing from a drive motor to a drive wheel of an electric vehicle (first electric vehicle) according to a first embodiment;

FIG. 1B is an enlarged cross-sectional view showing a portion of a counter shaft where a torque sensor is disposed;

DESCRIPTION OF THE PREFERRED EMBODIMENTS

Figure 2A:
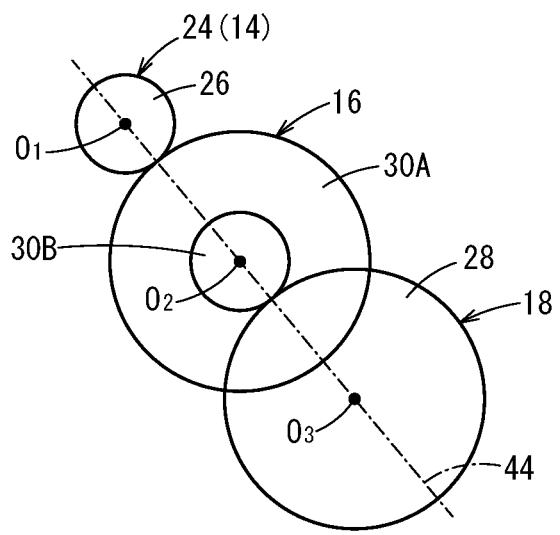
FIG. 2A is an explanatory diagram showing a first positional relationship between a motor shaft, the counter shaft, and a drive shaft as shown in cross-section along an axial direction of the respective shafts in the first electric vehicle.

Embodiments of an electric vehicle according to the present invention will be described below with reference to FIGS. 1A to 13C.

As shown in FIG. 1A, an electric vehicle according to a first embodiment (hereinafter referred to as a first electric vehicle 10A) includes a motor shaft 14, a counter shaft 16, and a drive shaft 18 for each of respective drive wheels 12. For example, in the case of four wheels, four motor shafts 14, four counter shafts 16, and four drive shafts 18 are included, and in the case of two wheels, two motor shafts 14, two counter shafts 16, and two drive shafts 18 are included.

Moreover, two drive wheels 12 may be connected to the drive shaft 18 via a differential device (not shown). In addition, a generator, a battery, or the like, neither of which is shown, may be provided. Further, in the case of a hybrid vehicle, a non-illustrated engine is mounted therein.

In the description given below, explanations will be centered on the motor shaft 14, the counter shaft 16, and the drive shaft 18 with respect to one drive wheel 12.

The first electric vehicle 10A includes a drive motor 20, the above-described motor shaft 14 connected to the drive motor 20, a main shaft 24 coupled via a spline 22 to the motor shaft 14, the above-described counter shaft 16 coupled with the main shaft 24, a drive shaft 18 coupled with the counter shaft 16, and a drive wheel 12 coupled with the drive shaft 18.

Further, one main gear 26 that rotates integrally with the main shaft 24 is fixed to the main shaft 24. One drive gear 28 that rotates integrally with the drive shaft 18 is fixed to the drive shaft 18.

Similarly, a first counter gear 30A that rotates integrally with the counter shaft 16 and engages with the main gear 26 is fixed in the vicinity of one end of the counter shaft 16, and a second counter gear 30B that rotates integrally with the counter shaft 16 and engages with the drive gear 28 is fixed in the vicinity of the other end of the counter shaft 16.

The first electric vehicle 10A includes two bearings 32a and 32b, for example, that support the motor shaft 14, two bearings 34a and 34b, for example, that support the main shaft 24, and two bearings 36a and 36b, for example, that support the drive shaft 18.

Furthermore, the first electric vehicle 10A includes three bearings (a first bearing 38A, a second bearing 38B, and a third bearing 38C) that support the counter shaft 16. For example, within the counter shaft 16, the first bearing 38A supports one end portion thereof in the vicinity of the drive motor 20, the second bearing 38B supports a location in the vicinity of the center of the counter shaft 16, and for example, within the counter shaft 16, the third bearing 38C supports another end portion thereof in the vicinity of the drive wheel 12. The first counter gear 30A is fixed between the first bearing 38A and the second bearing 38B, and the second counter gear 30B is fixed between the second bearing 38B and the third bearing 38C.

Additionally, in the first electric vehicle 10A, a torque sensor 42 is disposed on an outer periphery of the counter shaft 16. In particular, when the drive motor 20 is driven, the torque sensor 42 is disposed in a region where the slope of the bending moment occurring on the counter shaft 16 is minimum. A magnetostrictive torque sensor, for example, is preferably adopted as the torque sensor 42.

As shown in FIG. 1B, the torque sensor 42 includes a plurality of magnetostrictive layers $100a$ and $100b$, and a plurality of coils $102a$ and $102b$. The magnetostrictive layers $100a$ and $100b$ (magnetostrictive films) are disposed on an outer peripheral surface of the counter shaft 16. The magnetostrictive layers $100a$ and $100b$ are formed by plating. Alternatively, the magnetostrictive layers $100a$ and $100b$ may be constituted by grooves formed by a knurling process, magnetostrictive metallic films affixed using an adhesive, or press-fitted annular magnetostrictive metallic members. On the other hand, the coils $102a$ and $102b$ are disposed in a cylinder 104 that is fixed to a non-illustrated support member.

Next, a preferable arrangement position of the torque sensor 42 with respect to the counter shaft 16 will be described with reference to FIGS. 2A to 2C.

As shown in FIG. 2A, a positional relationship between the motor shaft 14, the counter shaft 16, and the drive shaft 18 is preferably defined in a manner so that, when viewed in an axial cross-section of the motor shaft 14, the counter shaft 16, and the drive shaft 18, the respective axial centers $O_1$, $O_2$, and $O_3$ of the motor shaft 14, the counter shaft 16, and the drive shaft 18 are aligned on a straight line 44. Consequently, the problem of loads from the motor shaft 14 and the drive shaft 18 being applied with respect to the counter shaft 16 can be simplified into a problem of bending a beam that is subjected to a lateral load.

Figure 2B:
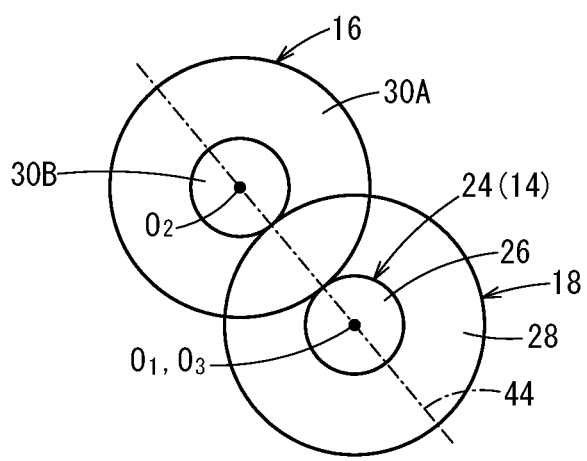
FIG. 2B is an explanatory diagram showing a second positional relationship.

As another positional relationship, as shown in FIG. 2B, the positional relationship between the motor shaft 14 and the drive shaft 18 may be coaxial when viewed in an axial cross section of each of the shafts.

Figure 2C:
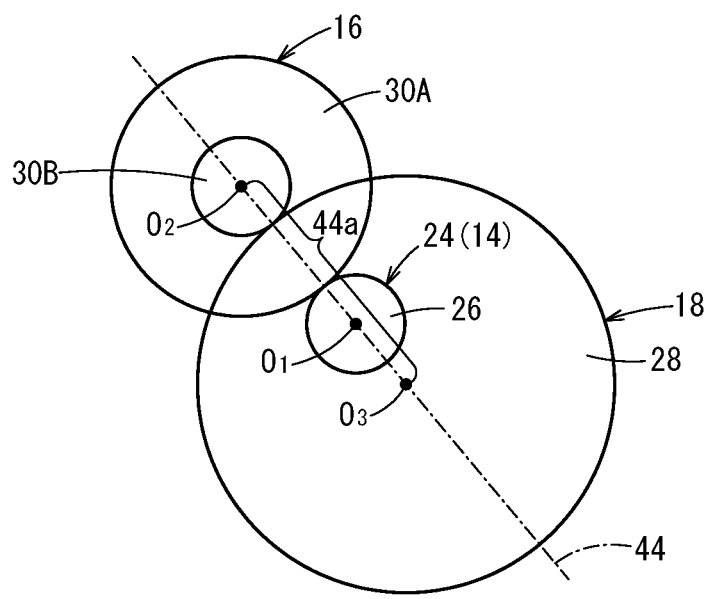
FIG. 2C is an explanatory diagram showing a third positional relationship.

Alternatively, as shown in FIG. 2C, the positional relationship between the motor shaft 14 and the drive shaft 18 may be defined in a manner so that, when viewed in an axial cross-section of each of the shafts, the centers of the respective shafts are aligned on the straight line 44, and the axial center $O_1$ of the motor shaft 14 may be disposed on a line segment 44a between the axial center $O_2$ of the counter shaft 16 and the axial center $O_3$ of the drive shaft 18.

Next, with reference to FIGS. 3A to 10B, preferable arrangement positions of the torque sensor 42 with respect to the counter shaft 16 will be described.

From the fact that the counter shaft 16 is supported by the first bearing 38A, the second bearing 38B, and the third bearing 38C, and is subjected to the lateral loads F and aF, respectively, by the first counter gear 30A and the second counter gear 30B, such a situation can be regarded as a problem of bending a beam that is supported at three points (hereinafter referred to as a three-point-supported beam). Moreover, in this case, the term "a" indicates a gear ratio between the first counter gear 30A and the second counter gear 30B.

Figure 3D:
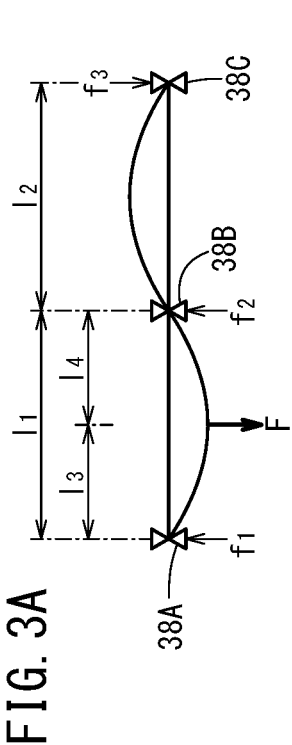
FIGS. 3D, 3E, and 3F are BMDs (bending moment diagrams) showing bending moments occurring on the counter shaft, and in particular, bending moments according to the principle of superposition, for a case in which a lateral load F is received by the first counter gear.
Figure 3E:
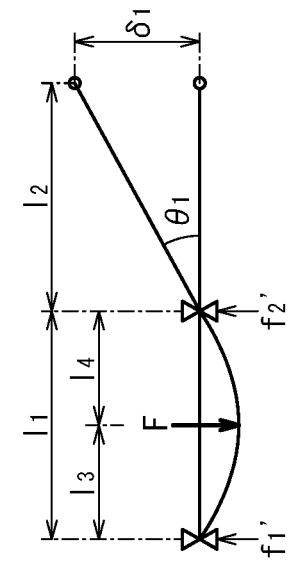
Figure 3F:
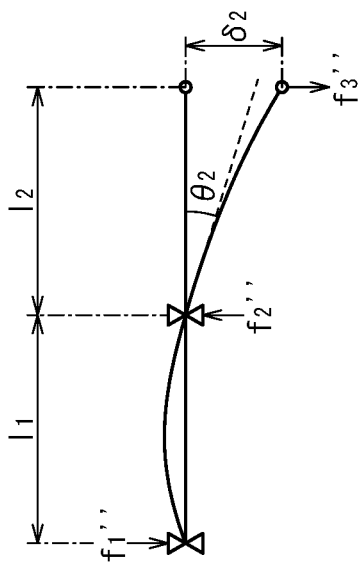
Figure 3A:
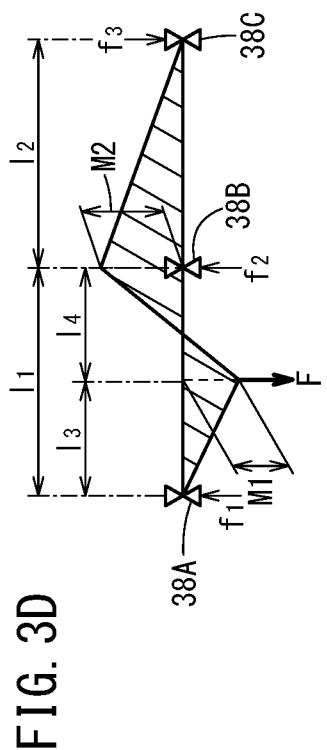
FIGS. 3A, 3B, and 3C are deflection curve diagrams showing deflection curves of the counter shaft, and in particular, deflection curves according to a principle of superposition, for a case in which a lateral load F is received by a first counter gear.

Initially, FIG. 3A is a deflection curve diagram showing a deflection curve of the counter shaft 16 in the case that the lateral load F is received by the first counter gear 30A, and FIG. 3D shows a BMD (bending moment diagram) showing the bending moment occurring on the counter shaft 16.

In this instance, the distance between the first bearing 38A and the second bearing 38B is $l_1$, the distance between the second bearing 38B and the third bearing 38C is $l_2$, the distance between the first bearing 38A and the first counter gear 30A is $l_3$, the distance between the first counter gear 30A and the second bearing 38B is $l_4$, the distance between the second bearing 38B and the second counter gear 30B is $l_5$, and the distance between the second counter gear 30B and the third bearing 38C is $l_6$. Further, the terms $f_1$, $f_2$, and $f_3$ indicate lateral loads occurring on the first bearing 38A, the second bearing 38B, and the third bearing 38C, respectively.

Figure 3B:
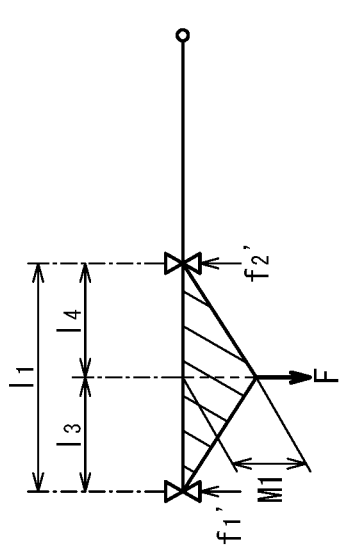
Figure 3C:
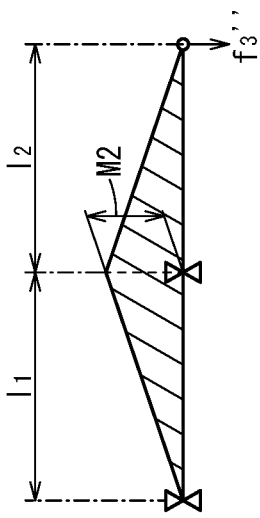

The deflection of the beam in the three-point-supported beam which is shown in FIG. 3A can be expressed as a superposition of the deflection curve diagram shown in FIG. 3B and the deflection curve diagram shown in FIG. 3C. Similarly, the BMD in relation to the three-point-supported beam which is shown in FIG. 3D can be expressed as a superposition of the BMD shown in FIG. 3E and the BMD shown in FIG. 3F. After having made such a superposition, since there is no deflection of the beam at the third bearing 38C, the relationship between the deflection $\delta_1$ shown in FIG. 3B and the deflection $\delta_2$ shown in FIG. 3C is conditioned upon $\delta_1=\delta_2$ (a statically indeterminate problem). Consequently, the lateral load f3" can be found, and the BMD can be determined. Hereinafter, the flexural rigidity of the shaft is calculated and determined as EI.

First, due to the lateral load F of the first counter gear 30A, the respective bending moments M1 and M2 at the position of the first counter gear 30A and at the position of the second bearing 38B are determined by the superposition of FIGS. 3E and 3F, and become as shown by the following expression (1) and expression (2).

$$M1 = f_1' l_3 - f_3'' l_2 \frac{l_3}{l_1} \tag{1}$$

$$M2 = f_3'' l_2 \tag{2}$$

Further, concerning the deflection curve diagram of FIG. 3B and the BMD of FIG. 3E, the relationships of the following expression (3), expression (4), and expression (5) are established.

$$f_1' = \frac{l_4}{l_1} \cdot F \tag{3}$$

$$\theta_1 = \frac{F l_3}{6 E I l_1} (l_1^2 - l_3^2) \tag{4}$$

$$\delta_1 = \theta_1 l_2 \tag{5}$$

$$= \frac{F l_2 l_3}{6 E I l_1} (l_1^2 - l_3^2)$$

Figure 4A:
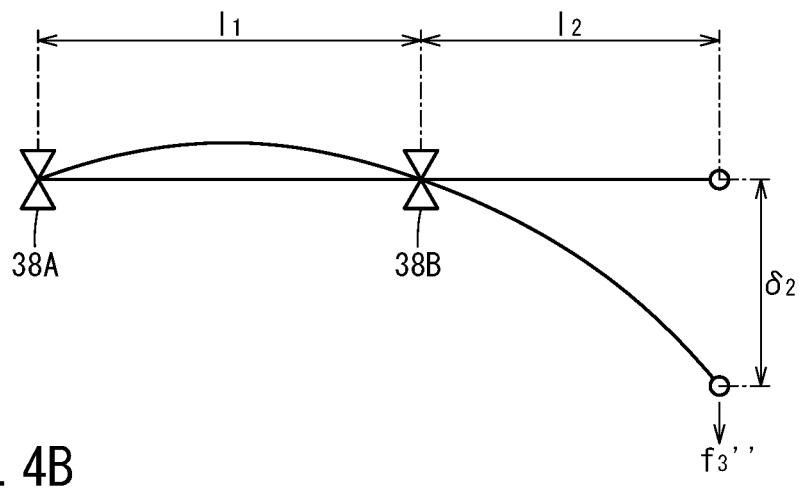
FIGS. 4A, 4B, and 4C are explanatory diagrams showing the deflection curve diagram of FIG. 3C in accordance with the principle of superposition.
Figure 4B:
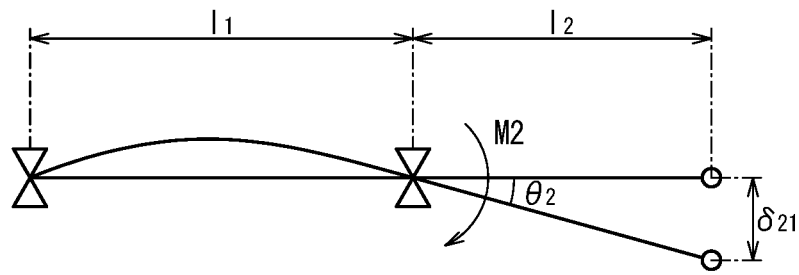
Figure 4C:
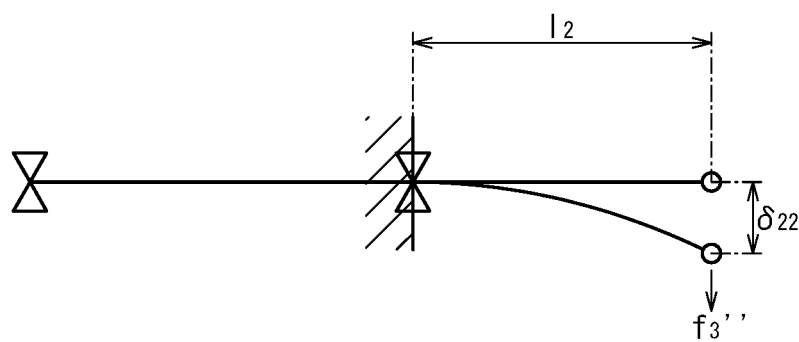

Concerning the deflection curve diagram of FIG. 3C, the relationships of the following expression (6), expression (7), and expression (8) are established by the principle of superposition as shown in FIGS. 4A to 4C.

$$\theta_2 = \frac{f_3'' l_2 l_1}{3 E I} \tag{6}$$

$$\delta_{21} = l_2 \theta_2 = \frac{f_3'' l_1 l_2^2}{3 E I} \tag{7}$$

$$\delta_{22} = \frac{f_3'' l_2^3}{3 E I} \tag{8}$$

Further, from expression (7) and expression (8) shown above, the relationship of the following expression (9) is established.

$$\delta_2 = \delta_{21} + \delta_{22} \tag{9}$$

$$= \frac{f_3'' l_2^2 (l_1 + l_2)}{3 E I}$$

From the aforementioned condition $\delta_1=\delta_2$, and using the above-described expression (5) and expression (9), the following expression (10) is obtained.

$$\frac{F l_2 l_3}{6 E I l_1} (l_1^2 - l_3^2) = \frac{f_3'' l_2^2 (l_1 + l_2)}{3 E I} \tag{10}$$

$$f_3'' = \frac{l_3 (l_1^2 - l_3^2)}{2 l_1 l_2 (l_1 + l_2)} \cdot F$$

In addition, the bending moment M1 at the position of the first counter gear 30A can be determined by substituting the above-described expression (3) and expression (10) into the above-described expression (1).

$$M1 = f_1' l_3 - f_3'' \frac{l_2 l_3}{l_1} \tag{11}$$

$$= \frac{l_3}{l_1} \left[ \frac{l_3 (l_1^2 - l_3^2)}{2 l_1 (l_1 + l_2)} + l_4 \right] \cdot F$$

Similarly, the bending moment M2 at the position of the second bearing 38B can be determined by substituting the above-described expression (10) into the above-described expression (2).

$$M2 = f_3'' l_2 \quad (12)$$

$$= \frac{l_3(l_1^2 - l_3^2)}{2l_1(l_1 + l_2)} \cdot F$$

Figure 5:
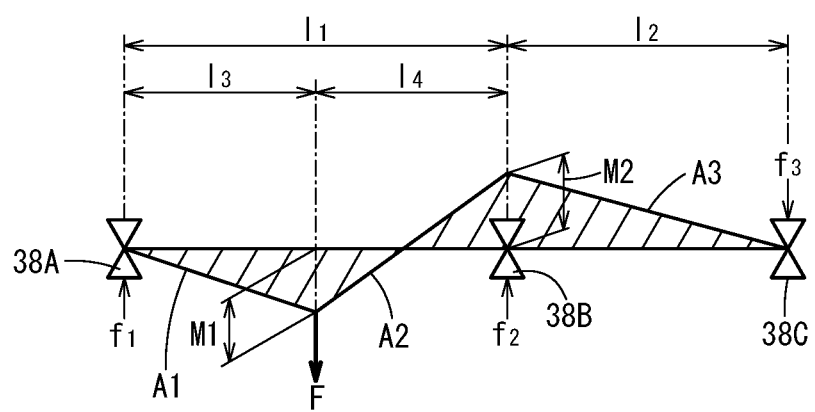
FIG. 5 is a BMD for a case in which a lateral load F is applied to the counter shaft by the first counter gear.

In accordance with the foregoing, in the case that the lateral load F is applied by the first counter gear 30A to the three-point-supported beam, the BMD becomes as shown in FIG. 5. In addition, the slope A1 of the bending moment between the first bearing 38A and the first counter gear 30A, the slope A2 of the bending moment between the first counter gear 30A and the second bearing 38B, and the slope A3 of the bending moment between the second bearing 38B and the third bearing 38C are as shown by the following expressions.

$$A1 = \frac{M1}{l_1} \quad (13)$$

$$= \frac{1}{l_1} \left[ \frac{l_3(l_1^2 - l_3^2)}{2l_1(l_1 + l_2)} + l_4 \right] \cdot F$$

$$A2 = \frac{M1 + M2}{l_4} \quad (14)$$

$$= \frac{l_3}{l_1 l_4} \left[ \frac{(l_1 + l_3)(l_1^2 - l_3^2)}{2l_1(l_1 + l_2)} + l_4 \right] \cdot F$$

$$A3 = \frac{M2}{l_2} \quad (15)$$

$$= \frac{l_3(l_1^2 - l_3^2)}{2l_1 l_2(l_1 + l_2)} \cdot F$$

Next, a case in which the lateral load aF is received by the second counter gear 30B will be described with reference to FIGS. 6A to 6F.

Figure 6A:
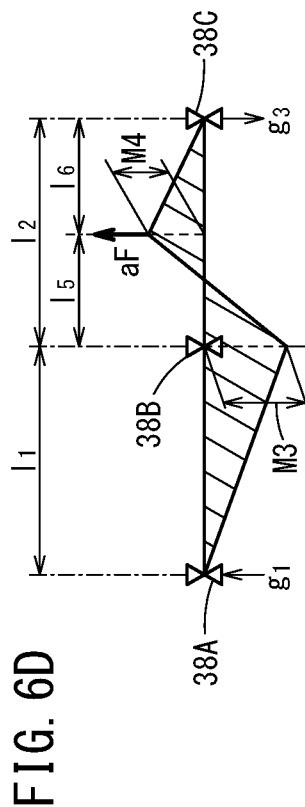
FIGS. 6A, 6B, and 6C are deflection curve diagrams showing deflection curves of the counter shaft, and in particular, deflection curves according to a principle of superposition, for a case in which a lateral load aF is received by a second counter gear.
Figure 6B:
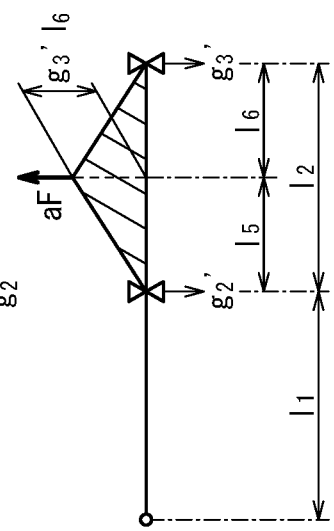
Figure 6C:
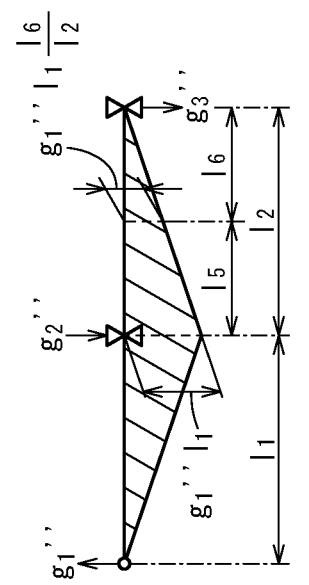
Figure 6D:
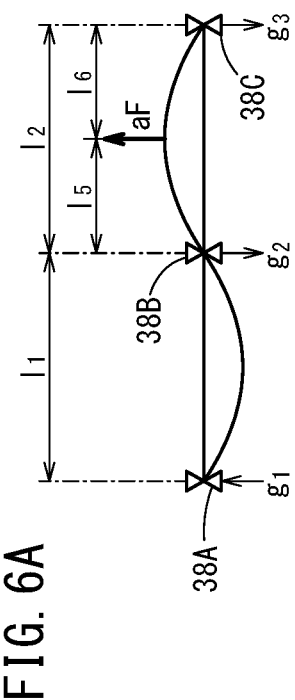
FIGS. 6D, 6E, and 6F are BMDs (bending moment diagrams) showing bending moments occurring on the counter shaft, and in particular, bending moments according to a principle of superposition, for a case in which a lateral load aF ("a" indicates a gear ratio) is received by the second counter gear.

FIG. 6A is a deflection curve diagram showing a deflection curve of the counter shaft 16 in the case that the lateral load aF is received by the second counter gear 30B, and FIG. 6D shows a BMD (bending moment diagram) showing the bending moment occurring on the counter shaft 16. Further, the terms $g_1$, $g_2$, and $g_3$ indicate lateral loads occurring on the first bearing 38A, the second bearing 38B, and the third bearing 38C.

The deflection of the beam in the three-point-supported beam which is shown in FIG. 6A can be expressed as a superposition of the deflection curve diagram shown in FIG. 6B and the deflection curve diagram shown in FIG. 6C. Similarly, the BMD in relation to the three-point-supported beam which is shown in FIG. 6D can be expressed as a superposition of the BMD shown in FIG. 6E and the BMD shown in FIG. 6F. At this time, since there is no deflection of the beam at the first bearing 38A, the relationship between the deflection $\delta_3$ shown in FIG. 6B and the deflection $\delta_4$ shown in FIG. 6C is conditioned upon $\delta_3 = \delta_4$ (a statically indeterminate problem). Consequently, the lateral load $g_3''$ can be found, and the BMD can be determined. The calculation and determination thereof are as shown below.

Figure 6E:
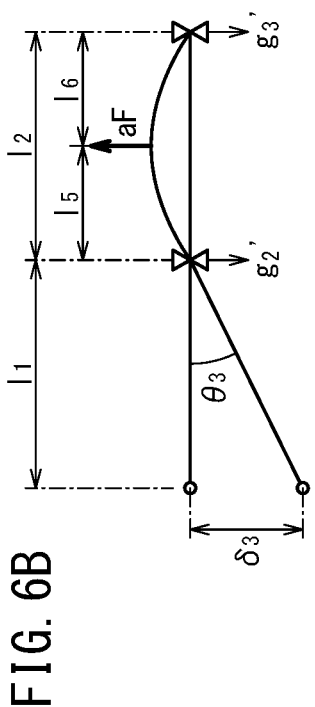
Figure 6F:
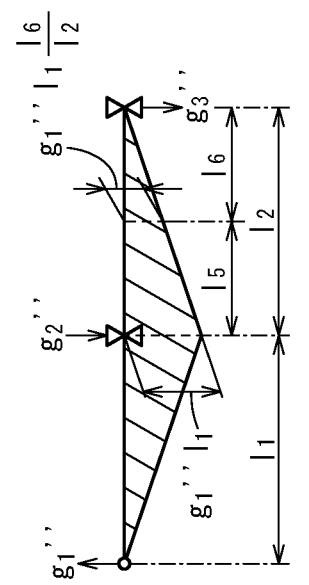

First, due to the lateral load aF of the second counter gear 30B, the respective bending moments M3 and M4 at the position of the second bearing 38B and at the position of the second counter gear 30B are determined by the superposition of FIGS. 6E and 6F, and become as shown by the following expression (1)' and expression (2)'.

$$M3 = g_1'' l_1 \quad (1)'$$

$$M4 = g_3' l_6 + g_1'' l_1 \frac{l_6}{l_2} \quad (2)'$$

Concerning the deflection curve diagram of FIG. 6B and the BMD of FIG. 6E, the relationships of the following expression (3)', expression (4)', and expression (5)' are established.

$$g_3' = \frac{l_5}{l_2} \cdot aF \quad (3)'$$

$$\theta_3 = \frac{aF l_6}{6EI l_2}(l_2^2 - l_6^2) \quad (4)'$$

$$\delta_3 = \theta_3 l_1 \quad (5)'$$

$$= \frac{aF l_1 l_6}{6EI l_2}(l_2^2 - l_6^2)$$

Figure 7A:
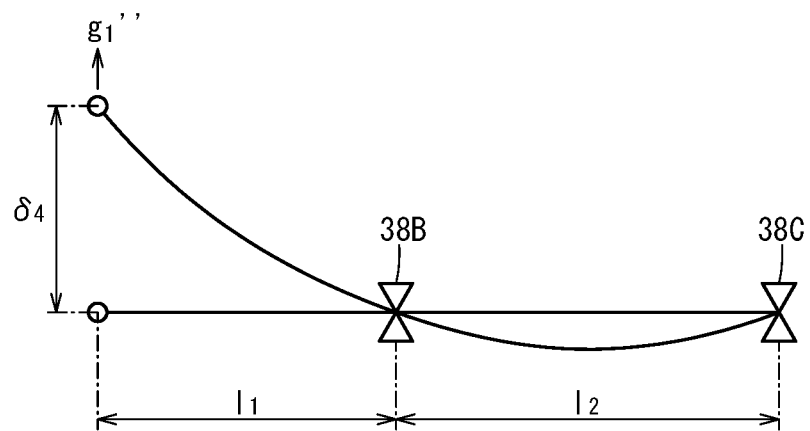
FIGS. 7A, 7B, and 7C are explanatory diagrams showing the deflection curve diagram of FIG. 6C in accordance with the principle of superposition.
Figure 7B:
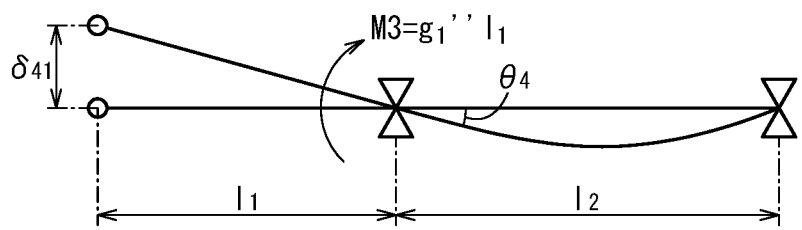
Figure 7C:
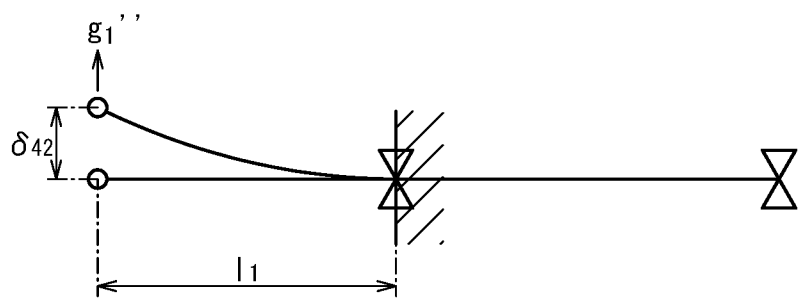

Concerning the deflection curve diagram of FIG. 6C, the relationships of the following expression (6)', expression (7)', and expression (8)' are established by the principle of superposition as shown in FIGS. 7A to 7C.

$$\theta_4 = \frac{g_1'' l_1 l_2}{3EI} \quad (6)'$$

$$\delta_{41} = l_1 \theta_4 = \frac{g_1'' l_1^2 l_2}{3EI} \quad (7)'$$

$$\delta_{42} = \frac{g_1'' l_1^3}{3EI} \quad (8)'$$

Further, from expression (7)' and expression (8)' shown above, the relationship of the following expression (9)' is established.

$$\delta_4 = \delta_{41} + \delta_{42} \quad (9)'$$

$$= \frac{g_1'' l_1^2 (l_1 + l_2)}{3EI}$$

From the aforementioned condition $\delta_3 = \delta_4$, and using the above-described expression (5)' and expression (9)', the following expression (10)' is obtained.

$$\frac{aF l_1 l_6}{6EI l_2}(l_2^2 - l_6^2) = \frac{g_1'' l_1^2 (l_1 + l_2)}{3EI} \quad (10)'$$

$$g_1'' = \frac{l_6(l_2^2 - l_6^2)}{2l_1 l_2(l_1 + l_2)} \cdot aF$$

In addition, the bending moment M3 at the position of the second bearing 38B can be determined by substituting the above-described expression (10)' into the above-described expression (1)'.

$$M3 = g_1'' l_1 \quad (11)'$$

-continued $$= \frac{l_6(l_2^2 - l_6^2)}{2l_2(l_1 + l_2)} \cdot aF$$

Similarly, the bending moment M4 at the position of the second counter gear 30B can be determined by substituting the above-described expressions (3)' and (10)' into the above-described expression (2)'.

$$M4 = g_3'l_6 + g_1''h_1\frac{l_6}{l_2} \quad (12)'$$

$$= \frac{l_6}{l_2}\left[\frac{l_6(l_2^2 - l_6^2)}{2l_2(l_1 + l_2)} + l_5\right] \cdot aF$$

Figure 8:
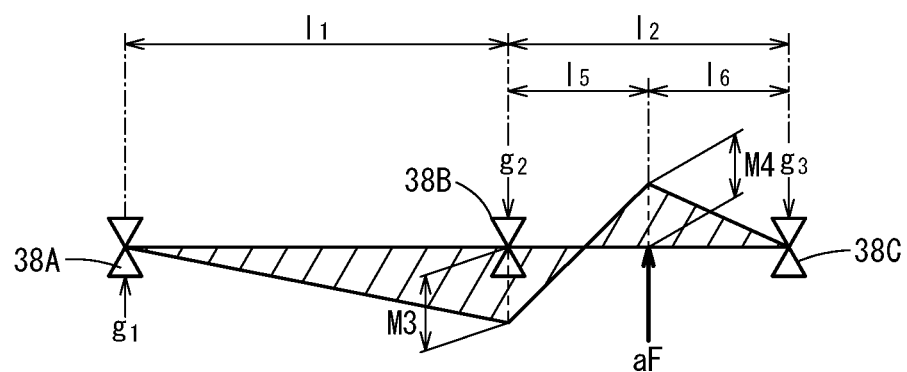
FIG. 8 is a BMD for a case in which a lateral load aF is applied to the counter shaft by the second counter gear.

In accordance with the foregoing, in the case that the lateral load aF is applied by the second counter gear 30B to the three-point-supported beam, the BMD becomes as shown in FIG. 8. In addition, the slope B1 of the bending moment (see FIG. 9C) between the first bearing 38A and the second bearing 38B, and the slope B2 of the bending moment (see FIG. 9C) between the second bearing 38B and the second counter gear 30B are as shown by the following expressions.

$$B1 = \frac{M3}{l_1} \quad (13)'$$

$$= \frac{l_6(l_2^2 - l_6^2)}{2l_1 l_2(l_1 + l_2)} \cdot aF$$

$$B2 = \frac{M3 + M4}{l_5} \quad (14)'$$

$$= \frac{l_6}{l_2 l_5}\left[\frac{(l_2 + l_6)(l_2^2 - l_6^2)}{2l_2(l_1 + l_2)} + l_5\right] \cdot aF$$

To summarize the content discussed above, as shown in FIG. 9A, to the counter shaft 16 which is supported at three points by the first bearing 38A, the second bearing 38B, and the third bearing 38C, there is applied the lateral force F by the first counter gear 30A to which the rotational force from the drive motor 20 is transmitted, and there is applied the lateral force aF by the second counter gear 30B that transmits the rotational force from the drive motor 20 to the drive wheel 12.

In such a case, the BMD of the counter shaft 16 can be determined by superimposing the BMD (see FIG. 9B) due to the lateral load F of the first counter gear 30A, and the BMD (see FIG. 9C) due to the lateral load aF of the second counter gear 30B.

In addition, in order to superimpose the BMD due to the lateral load F of the first counter gear 30A and the BMD due to the lateral load aF of the second counter gear 30B, and thereby generate a BMD in which the slope of the bending moment becomes a minimum value or zero, the following two methods may be cited.

Figure 9A:
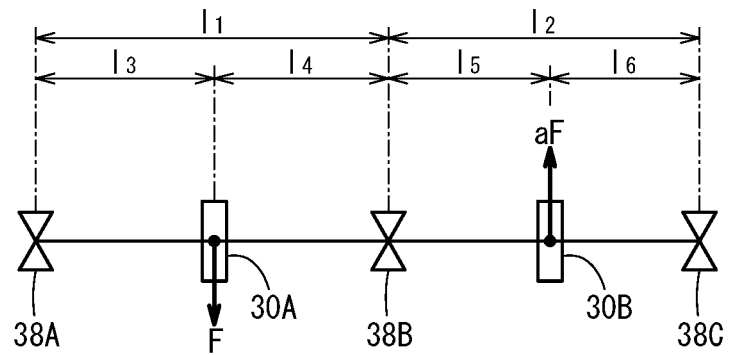
FIG. 9A is an explanatory diagram showing a positional relationship between the lateral load F applied to the counter shaft by the first counter gear and the lateral load aF applied to the counter shaft by the second counter gear.
Figure 9B:
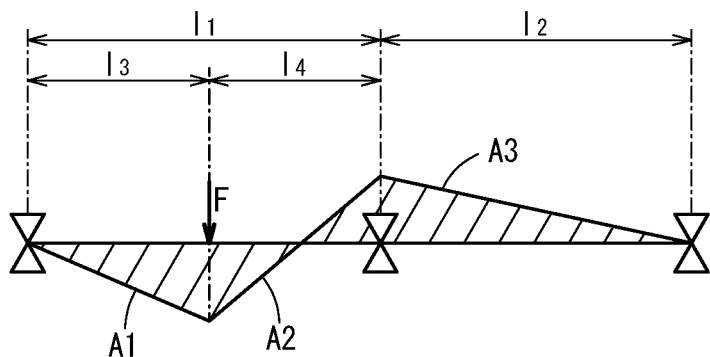
FIG. 9B is a BMD for a case in which the lateral load F is applied by the first counter gear.
Figure 9C:
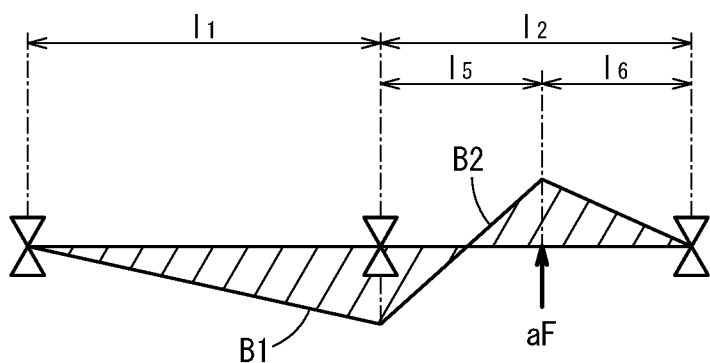
FIG. 9C is a BMD for a case in which the lateral load aF is applied by the second counter gear.

The first method is a case in which the slope A1 between the first counter gear 30A and the second bearing 38B in the BMD of FIG. 9B, and the slope B1 between the first bearing 38A and the second bearing 38B in the BMD of FIG. 9C are made equal (if positive and negative values are opposite, the absolute values thereof are made equal).

More specifically, the first counter gear 30A, the second counter gear 30B, the first bearing 38A, the second bearing 38B, and the third bearing 38C are disposed in a positional relationship that satisfies the following equation (15)'.

$$a = \frac{2l_2 l_3(l_1 + l_2)}{l_4 l_6(l_2^2 - l_6^2)}\left[\frac{(l_1 + l_3)(l_1^2 - l_3^2)}{2l_1(l_1 + l_2)} + l_4\right] \quad (15)'$$

Figure 10A:
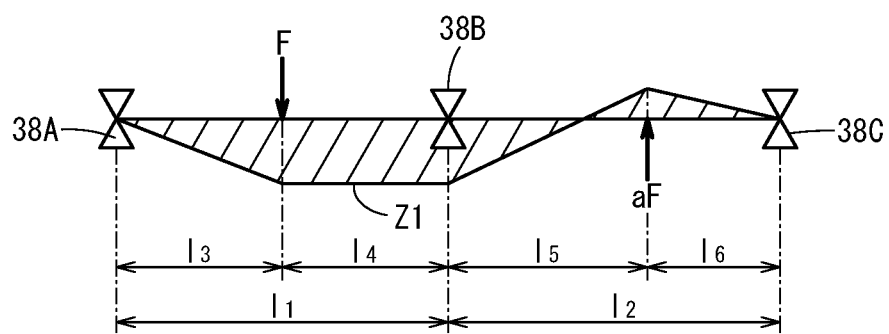
FIG. 10A is a BMD showing a state in which, within the counter shaft, a region is generated in which a slope of the bending moment becomes a minimum value or zero between the first counter gear and a second bearing.

Consequently, as shown in FIG. 10A, within the counter shaft 16, a region Z1 where the slope of the bending moment is a minimum value or zero is generated between the first counter gear 30A and the second bearing 38B.

The second method is a case in which the slope A3 between the second bearing 38B and the third bearing 38C in the BMD of FIG. 9B is made equal to the slope B2 between the second bearing 38B and the second counter gear 30B in the BMD of FIG. 9C.

More specifically, the first counter gear 30A, the second counter gear 30B, the first bearing 38A, the second bearing 38B, and the third bearing 38C are disposed in a positional relationship that satisfies the following equation (15)''.

$$\frac{1}{a} = \frac{2l_1 l_6(l_1 + l_2)}{l_3 l_5(l_1^2 - l_3^2)}\left[\frac{(l_2 + l_6)(l_2^2 - l_6^2)}{2l_2(l_1 + l_2)} + l_5\right] \quad (15)''$$

Figure 10B:
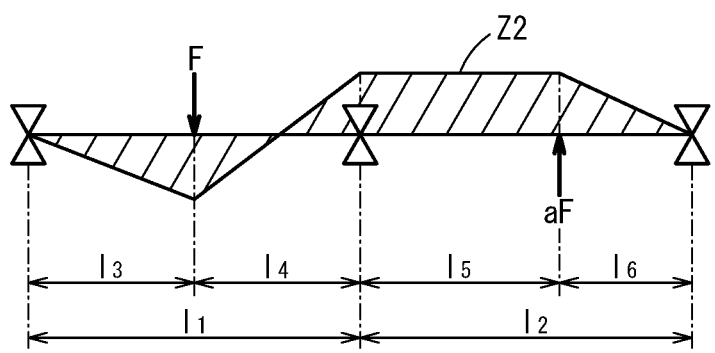
FIG. 10B is a BMD showing a state in which, within the counter shaft, a region is generated in which a slope of the bending moment becomes a minimum value or zero between the second bearing and the second counter gear.
Figure 11:
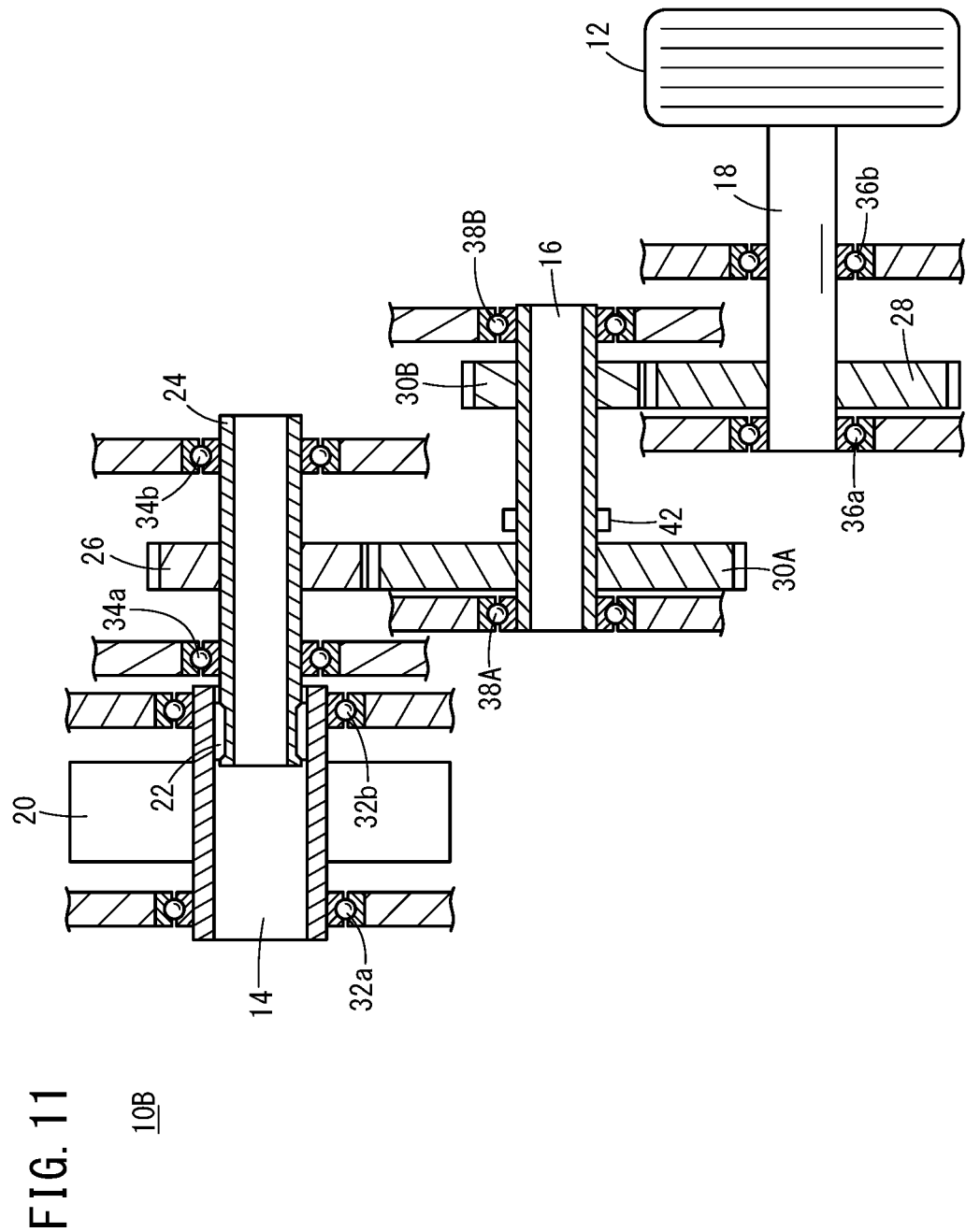
FIG. 11 is a cross-sectional view showing an example of a configuration existing from a drive motor to a drive wheel of an electric vehicle (second electric vehicle) according to a second embodiment.

Consequently, as shown in FIG. 10B, within the counter shaft 16, a region Z2 where the slope of the bending moment is a minimum value or zero is generated between the second bearing 38B and the second counter gear 30B.

In addition, in the first electric vehicle 10A, within the counter shaft 16, the torque sensor 42 is disposed in the region between the first counter gear 30A and the second bearing 38B, or alternatively, in the region between the second bearing 38B and the second counter gear 30B.

As a result, it is possible to suppress the influence of a bending moment occurring on the counter shaft 16 at a time that the motor is driven, and it is possible to accurately detect the torque applied to the counter shaft 16.

Next, an electric vehicle according to a second embodiment (hereinafter referred to as a second electric vehicle 10B) will be described with reference to FIGS. 11 to 13C.

The second electric vehicle 10B has substantially the same configuration as the first electric vehicle 10A described above, but as shown in FIG. 11, differs therefrom in that the bearings that support the counter shaft 16 are two bearings (the first bearing 38A and the second bearing 38B).

More specifically, within the counter shaft 16, for example, the first bearing 38A supports one end portion thereof in the vicinity of the drive motor 20, and within the counter shaft 16, for example, the second bearing 38B supports another end portion thereof in the vicinity of the drive wheel 12. The first counter gear 30A and the second counter gear 30B are fixed between the first bearing 38A and the second bearing 38B.

In addition, in the second electric vehicle 10B, when the drive motor 20 is driven, the torque sensor 42 is disposed in a region where the slope of the bending moment occurring on the counter shaft 16 is a minimum value or zero.

Next, a preferable arrangement position of the torque sensor 42 with respect to the counter shaft 16 will be described with reference to FIGS. 12A to 13C.

Figure 12A:
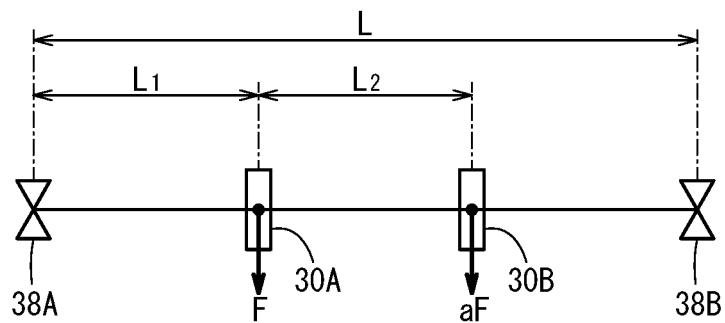
FIG. 12A is an explanatory diagram showing a positional relationship between the lateral load F applied to the counter shaft by the first counter gear and the lateral load aF applied to the counter shaft by the second counter gear in the second electric vehicle.

As shown in FIG. 12A, from the fact that the counter shaft 16 is supported by the two bearings (the first bearing 38A and the second bearing 38B) and is subjected to the lateral loads by the first counter gear 30A and the second counter gear 30B, such a situation can be regarded as a problem of bending a beam that is supported at two points.

In addition, the BMD which indicates the bending moment occurring on the counter shaft 16 can be determined by superimposing the BMD (see FIG. 12B) due to the lateral load F of the first counter gear 30A, and the BMD (see FIG. 12C) due to the lateral load aF of the second counter gear 30B. In this instance, the distance between the first bearing 38A and the second bearing 38B is L, the distance between the first bearing 38A and the first counter gear 30A is $L_1$, and the distance between the first counter gear 30A and the second counter gear 30B is $L_2$.

Lateral loads fa and fb occurring on the first bearing 38A and the second bearing 38B due to the lateral load F of the first counter gear 30A, and a bending moment Ma at the position of the first counter gear 30A are as follows.

$$fa = \frac{L - L_1}{L} \cdot F \quad (16)$$

$$fb = \frac{L_1}{L} \cdot F \quad (17)$$

$$Ma = \frac{L_1(L - L_1)}{L} \cdot F \quad (18)$$

Accordingly, the slope A of the bending moment between the first counter gear 30A and the second bearing 38B is as follows.

$$A = \frac{L_1}{L} \cdot F \quad (19)$$

On the other hand, lateral loads ga and gb occurring on the first bearing 38A and the second bearing 38B due to the lateral load aF of the second counter gear 30B, and a bending moment Mb at the position of the second counter gear 30B are as follows.

$$ga = \frac{L - L_1 - L_2}{L} \cdot aF \quad (20)$$

$$gb = \frac{L_1 + L_2}{L} \cdot aF \quad (21)$$

$$Mb = \frac{(L_1 + L_2)(L - L_1 - L_2)}{L} \cdot aF \quad (22)$$

Accordingly, the slope B of the bending moment between the first bearing 38A and the second counter gear 30B is as follows.

$$B = \frac{L - L - L_2}{L} \cdot aF \quad (23)$$

Figure 12B:
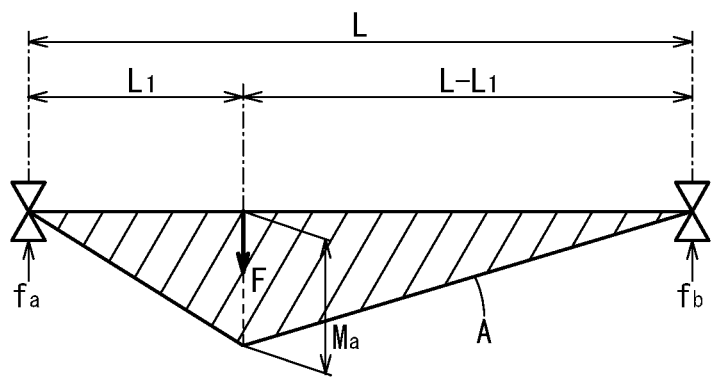
FIG. 12B is a BMD for a case in which the lateral load F is applied by the first counter gear.
Figure 12C:
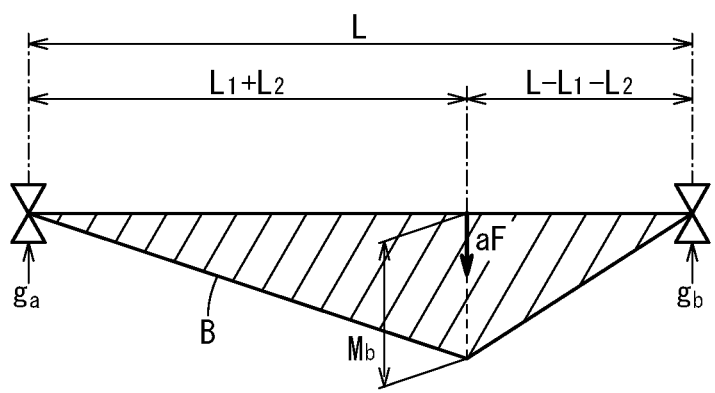
FIG. 12C is a BMD for a case in which the lateral load aF is applied by the second counter gear.
Figure 13A:
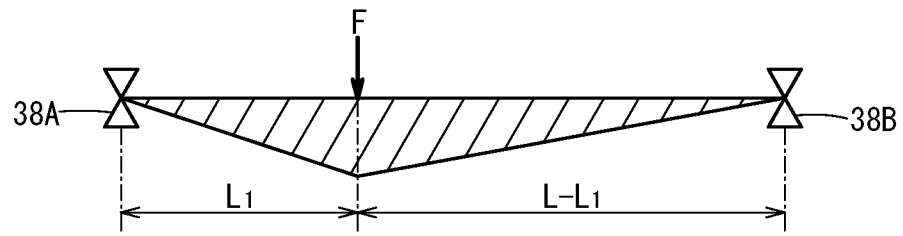
FIG. 13A is a BMD for a case in which the lateral load F is applied by the first counter gear.
Figure 13B:
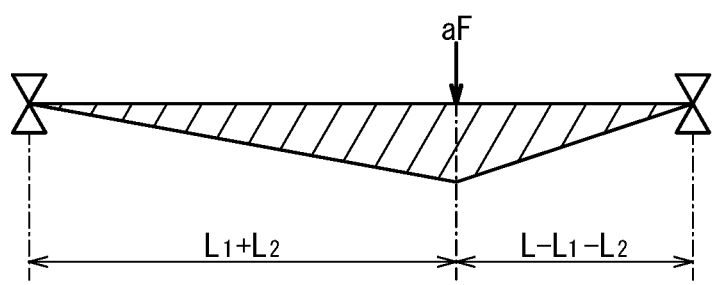
FIG. 13B is a BMD for a case in which the lateral load aF is applied by the second counter gear.
Figure 13C:
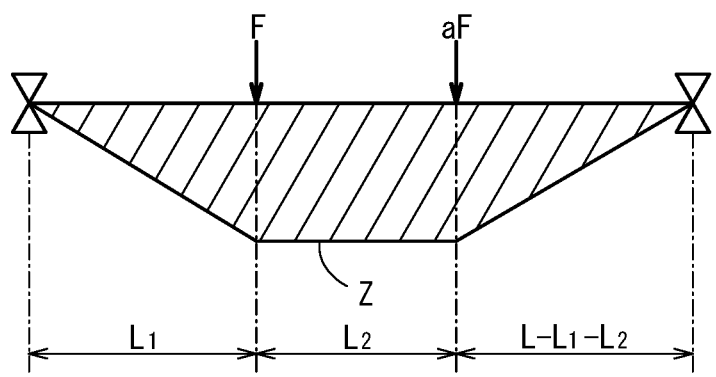
FIG. 13C is a BMD showing a state in which a region is generated in which a slope of the bending moment becomes a minimum value or zero between the first counter gear and the second bearing.

In addition, in order to superimpose the BMD due to the lateral load F of the first counter gear 30A (see FIG. 13A) and the BMD due to the lateral load aF of the second counter gear 30B (see FIG. 13B), and thereby generate a BMD in which the slope of the bending moment becomes a minimum value or zero, a case is established in which the slope A between the first counter gear 30A and the second bearing 38B in the BMD of FIG. 12B, and the slope B between the first bearing 38A and the second counter gear 30B in the BMD of FIG. 12C are made equal (if positive and negative values are opposite, the absolute values thereof are made equal). Consequently, as shown in FIG. 13C, within the counter shaft 16, a region Z where the slope of the bending moment is a minimum value or zero is generated between the first counter gear 30A and the second counter gear 30B. More specifically, the first bearing 38A, the second bearing 38B, the first counter gear 30A, and the second counter gear 30B are disposed in a positional relationship that satisfies the following equation (24).

$$a = \frac{L_1}{L - L_1 - L_2} \quad (24)$$

In addition, in the second electric vehicle 10B, within the counter shaft 16, the torque sensor 42 is disposed in the region between the first counter gear 30A and the second counter gear 30B.

As a result, it is possible to suppress the influence of a bending moment occurring on the counter shaft 16 at a time that the motor is driven, and it is possible to accurately detect the torque applied to the counter shaft 16.

In this manner, the electric vehicle according to the present embodiment includes the drive motor 20, the motor shaft 14 connected to the drive motor 20, the counter shaft 16 coupled with the motor shaft 14, the drive shaft 18 coupled with the counter shaft 16, the drive wheel 12 coupled with the drive shaft 18, the plurality of bearings configured to support the counter shaft 16, and the plurality of gears 30A and 30B configured to rotate integrally with the counter shaft 16, wherein the torque sensor 42 is disposed in a region in which the slope of the bending moment occurring on the counter shaft 16 is minimum at the time that the drive motor 20 is driven.

In accordance with these features, it is possible to suppress the influence of a bending moment occurring on the counter shaft 16 at a time that the motor is driven, and it is possible to accurately detect the torque applied to the counter shaft 16.

Further, the first electric vehicle 10A according to the present embodiment includes the drive motor 20, the motor shaft 14 connected to the drive motor 20, the counter shaft 16 coupled with the motor shaft 14, the drive shaft 18 coupled with the counter shaft 16, the drive wheel 12 coupled with the drive shaft 18, the first bearing 38A, the second bearing 38B, and the third bearing 38C configured to support the counter shaft 16, and the first counter gear 30A and the second counter gear 30B configured to rotate integrally with the counter shaft 16, wherein a positional relationship between the motor shaft 14, the counter shaft 16, and the drive shaft 18 is defined in a manner so that, when viewed in an axial cross-section of the motor shaft 14, the counter shaft 16, and the drive shaft 18, respective centers of the motor shaft 14, the counter shaft 16, and the drive shaft 18 are aligned respectively on the straight line 44, and assuming that a lateral load by the first counter gear 30A is represented by F, a lateral load by the second counter gear 30B is represented by aF where "a" indicates a gear ratio, a distance from the first bearing 38A to the second bearing 38B is represented by $l_1$, a distance from the second bearing 38B to the third bearing 38C is represented by $l_2$, a distance from the first bearing 38A to the first counter gear 30A is represented by $l_3$, a distance from the first counter gear 30A to the second bearing 38B is represented by $l_4$, a distance from the second bearing 38B to the second counter gear 30B is represented by $l_5$, and a distance from the second counter gear 30B to the third bearing 38C is represented by $l_6$, the first bearing 38A, the second bearing 38B, the third bearing 38C, the first counter gear 30A, and the second counter gear 30B are arranged in a positional relationship satisfying the following expression (25) or the following expression (26).

$$a = \frac{2l_2 l_3 (l_1 + l_2)}{l_4 l_6 (l_2^2 - l_6^2)} \left[ \frac{(l_1 + l_3)(l_1^2 - l_3^2)}{2l_1(l_1 + l_2)} + l_4 \right] \quad (25)$$

$$\frac{1}{a} = \frac{2l_1 l_6 (l_1 + l_2)}{l_3 l_5 (l_1^2 - l_3^2)} \left[ \frac{(l_2 + l_6)(l_2^2 - l_6^2)}{2l_2(l_1 + l_2)} + l_5 \right] \quad (26)$$

In accordance with the above features, first, by arranging the respective centers of the motor shaft 14, the counter shaft 16, and the drive shaft 18 so as to be aligned on the straight line 44 when viewed in an axial cross-section of the motor shaft 14, the counter shaft 16, and the drive shaft 18, the problem of loads from the motor shaft 14 and the drive shaft 18 being applied with respect to the counter shaft 16 can be simplified into a problem of bending a beam that is subjected to a lateral load. As a result, it is possible to easily determine the region in which the slope of the bending moment occurring on the counter shaft 16 is minimum.

In addition, in the case that the above-described expression (25) is satisfied, the torque sensor 42 is disposed within the counter shaft 16 between the first counter gear 30A and the second bearing 38B. More specifically, in the case that the above-described expression (25) is satisfied, at a time that the drive motor 20 is driven, the region in which the slope of the bending moment occurring on the counter shaft 16 is minimum is the region Z1 between the first counter gear 30A and the second bearing 38B. By arranging the torque sensor 42 in the region Z1, it is possible to accurately detect the torque that is applied to the counter shaft 16.

In the case that the above-described expression (26) is satisfied, the torque sensor 42 is disposed within the counter shaft 16 between the second bearing 38B and the second counter gear 30B. In the case that the above-described expression (26) is satisfied, at a time that the drive motor 20 is driven, the region in which the slope of the bending moment occurring on the counter shaft 16 is minimum is the region Z2 between the second bearing 38B and the second counter gear 30B. By arranging the torque sensor 42 in the region Z2, it is possible to accurately detect the torque that is applied to the counter shaft 16.

Further, the second electric vehicle 10B according to the present embodiment includes the drive motor 20, the motor shaft 14 connected to the drive motor 20, the counter shaft 16 coupled with the motor shaft 14, the drive shaft 18 coupled with the counter shaft 16, the drive wheel 12 coupled with the drive shaft 18, the first bearing 38A and the second bearing 38B configured to support the counter shaft 16, and the first counter gear 30A and the second counter gear 30B configured to rotate integrally with the counter shaft 16, wherein a positional relationship between the motor shaft 14, the counter shaft 16, and the drive shaft 18 is defined in a manner so that, when viewed in an axial cross-section of the motor shaft 14, the counter shaft 16, and the drive shaft 18, respective centers of the motor shaft 14, the counter shaft 16, and the drive shaft 18 are aligned respectively on the straight line 44, and assuming that a lateral load by the first counter gear 30A is represented by F, a lateral load by the second counter gear 30B is represented by aF where "a" indicates a gear ratio, a distance from the first bearing 38A to the second bearing 38B is represented by L, a distance from the first bearing 38A to the first counter gear 30A is represented by $L_1$, and a distance from the first counter gear 30A to the second counter gear 30B is represented by $L_2$, the first bearing 38A, the second bearing 38B, the first counter gear 30A, and the second counter gear 30B are arranged in a positional relationship satisfying the following expression (27).

$$a = \frac{L_1}{L - L_1 - L_2} \quad (27)$$

First, by arranging the respective centers of the motor shaft 14, the counter shaft 16, and the drive shaft 18 so as to be aligned on the straight line 44 when viewed in an axial cross-section of the motor shaft 14, the counter shaft 16, and the drive shaft 18, the problem of loads from the motor shaft 14 and the drive shaft 18 being applied with respect to the counter shaft 16 can be simplified into a problem of bending a beam that is subjected to a lateral load. As a result, it is possible to easily determine the region in which the slope of the bending moment occurring on the counter shaft 16 is minimum.

In the present embodiment, in the case that the above-described expression (27) is satisfied, the torque sensor 42 is disposed within the counter shaft 16 between the first counter gear 30A and the second counter gear 30B. In the case that the above-described expression (27) is satisfied, at a time that the drive motor 20 is driven, the region in which the slope of the bending moment occurring on the counter shaft 16 is minimum is the region Z between the first counter gear 30A and the second counter gear 30B. By arranging the torque sensor 42 in the region Z, it is possible to accurately detect the torque that is applied to the counter shaft 16.

In the present embodiment, the positional relationship between the motor shaft 14 and the drive shaft 18 is coaxial when viewed in an axial cross-section of each of the shafts. In accordance with this feature, the drive motor 20 and the drive wheel 12 can be disposed coaxially, and the drive unit of the electric vehicle can be made compact. In this case, when the gear diameter of the drive shaft 18 is fixed, the above-described gear ratio "a" of the counter shaft 16 can be changed by appropriately changing the diameter of the motor shaft 14.

In the present embodiment, the positional relationship between the motor shaft 14 and the drive shaft 18 is defined in a manner so that, when viewed in an axial cross-section of each of the shafts, the centers of the respective shafts are aligned on the straight line 44, and the center of the motor shaft 14 is disposed on the line segment 44a between the axial center $O_2$ of the counter shaft 16 and the axial center $O_3$ of the drive shaft 18.

In accordance with this feature, the axial center $O_1$ of the motor shaft 14 can be accommodated within a circle of the drive wheel 12, and the drive unit of the electric vehicle can be made compact. In this case, when the gear diameter of the drive shaft 18 is fixed, the above-described gear ratio "a" of the counter shaft 16 can be changed by appropriately changing the diameter of the motor shaft 14, or alternatively, by appropriately changing the position of the motor shaft 14 on the above-described line segment 44a.

The present invention is not limited to the embodiments described above, and it goes without saying that the present invention can be freely modified within a range that does not depart from the essence and gist of the present invention.

What is claimed is:

1. An electric vehicle comprising:
a drive motor;
a motor shaft connected to the drive motor;
a counter shaft coupled with the motor shaft;
a drive shaft coupled with the counter shaft;
a drive wheel coupled with the drive shaft;
a plurality of bearings configured to support the counter shaft; and
a plurality of gears configured to rotate integrally with the counter shaft;
wherein a torque sensor is disposed in a region in which a slope of a bending moment occurring on the counter shaft is minimum at a time that the drive motor is driven.

2. An electric vehicle comprising:
a drive motor;
a motor shaft connected to the drive motor;
a counter shaft coupled with the motor shaft;
a drive shaft coupled with the counter shaft;
a drive wheel coupled with the drive shaft;
a first bearing, a second bearing, and a third bearing configured to support the counter shaft; and
a first gear and a second gear configured to rotate integrally with the counter shaft;
wherein a positional relationship between the motor shaft, the counter shaft, and the drive shaft is defined in a manner so that, when viewed in an axial cross-section of the motor shaft, the counter shaft, and the drive shaft, respective centers of the motor shaft, the counter shaft, and the drive shaft are aligned respectively on a straight line;
and assuming that a lateral load by the first gear is represented by F;
a lateral load by the second gear is represented by aF where "a" indicates a gear ratio;
a distance from the first bearing to the second bearing is represented by $l_1$;
a distance from the second bearing to the third bearing is represented by $l_2$;
a distance from the first bearing to the first gear is represented by $l_3$;
a distance from the first gear to the second bearing is represented by $l_4$;
a distance from the second bearing to the second gear is represented by $l_5$; and
a distance from the second gear to the third bearing is represented by $l_6$;
the first bearing, the second bearing, the first gear, and the second gear are arranged in a positional relationship satisfying a following expression (a) or a following expression (b):

$$a = \frac{2l_2 l_3 (l_1 + l_2)}{l_4 l_6 (l_2^2 - l_6^2)} \left[ \frac{(l_1 + l_3)(l_1^2 - l_3^2)}{2l_1(l_1 + l_2)} + l_4 \right] \quad (a)$$

$$\frac{1}{a} = \frac{2l_1 l_6 (l_1 + l_2)}{l_3 l_5 (l_1^2 - l_3^2)} \left[ \frac{(l_2 + l_6)(l_2^2 - l_6^2)}{2l_2(l_1 + l_2)} + l_5 \right]. \quad (b)$$

3. The electric vehicle according to claim 2, wherein, in a case that the expression (a) is satisfied, a torque sensor is disposed within the counter shaft between the first gear and the second bearing.

4. The electric vehicle according to claim 2, wherein, in a case that the expression (b) is satisfied, a torque sensor is disposed within the counter shaft between the second bearing and the second gear.

5. An electric vehicle comprising:
a drive motor;
a motor shaft connected to the drive motor;
a counter shaft coupled with the motor shaft;
a drive shaft coupled with the counter shaft;
a drive wheel coupled with the drive shaft;
a first bearing and a second bearing configured to support the counter shaft; and
a first gear and a second gear configured to rotate integrally with the counter shaft;
wherein a positional relationship between the motor shaft, the counter shaft, and the drive shaft is defined in a manner so that, when viewed in an axial cross-section of the motor shaft, the counter shaft, and the drive shaft, respective centers of the motor shaft, the counter shaft, and the drive shaft are aligned respectively on a straight line;
and assuming that a lateral load by the first gear is represented by F;
a lateral load by the second gear is represented by aF where "a" indicates a gear ratio;
a distance from the first bearing to the second bearing is represented by L;
a distance from the first bearing to the first gear is represented by $L_1$; and
a distance from the first gear to the second gear is represented by $L_2$;
the first bearing, the second bearing, the first gear, and the second gear are arranged in a positional relationship satisfying a following expression (c):

$$a = \frac{L_1}{L - L_1 - L_2}. \quad (c)$$

6. The electric vehicle according to claim 5, wherein, in a case that the expression (c) is satisfied, a torque sensor is disposed within the counter shaft between the first gear and the second gear.

7. The electric vehicle according to claim 2, wherein a positional relationship between the motor shaft and the drive shaft is coaxial when viewed in the axial cross-section of each of the shafts.

8. The electric vehicle according to claim 5, wherein a positional relationship between the motor shaft and the drive shaft is coaxial when viewed in the axial cross-section of each of the shafts.

9. The electric vehicle according to claim 2, wherein the positional relationship between the motor shaft and the drive shaft is defined in a manner so that, when viewed in the axial cross-section of each of the shafts, the centers of the respective shafts are aligned on the straight line, and the center of the motor shaft is disposed on a line segment between an axial center of the counter shaft and an axial center of the drive shaft.

10. The electric vehicle according to claim 5, wherein the positional relationship between the motor shaft and the drive shaft is defined in a manner so that, when viewed in the axial cross-section of each of the shafts, the centers of the respective shafts are aligned on the straight line, and the center of the motor shaft is disposed on a line segment between an axial center of the counter shaft and an axial center of the drive shaft.

* * * * *